March 19, 1935. E. T. PEEL ET AL 1,995,221
FISHING REEL
Filed June 18, 1934 2 Sheets-Sheet 1
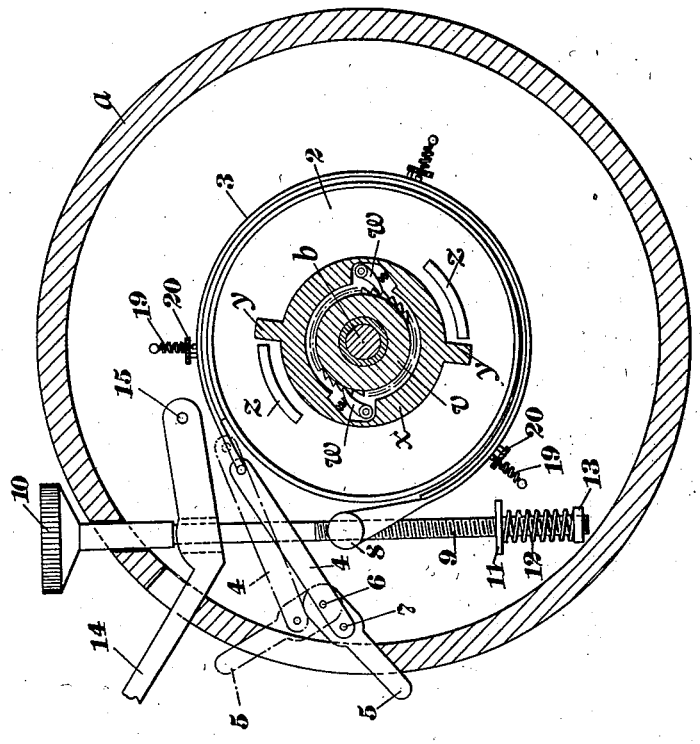
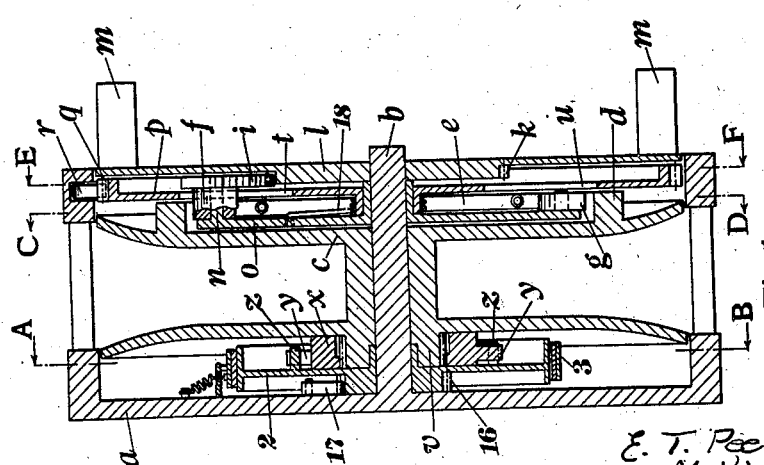
E. T. Peel
R. F. Kindersley
INVENTORS
By Marks & Clerk
Attys.

March 19, 1935.  E. T. PEEL ET AL  1,995,221
FISHING REEL
Filed June 18, 1934   2 Sheets-Sheet 2

E. T. Peel
R. F. Kindersley
INVENTORS

By: Marks & Clerk
ATTYS.

Patented Mar. 19, 1935

1,995,221

UNITED STATES PATENT OFFICE 1,995,221

FISHING REEL

Edward Townley Peel, London, England, and Richard Frampton Kindersley, Alexandria, Egypt Application June 18, 1934, Serial No. 731,192
In Great Britain July 13, 1933

6 Claims. (Cl. 242—84.5)

This invention relates to fishing reels and more particularly to such reels for use in catching game-fish.

The object of the present invention is to provide an improved construction and arrangement of reel and braking and winding or reeling mechanism which affords at all times the requisite braking action to resist the withdrawal of the line by the fish, whilst permitting the ready letting out of the line when baiting and also the reeling in of the line, the construction also allowing the reeling handles to remain stationary when the line is being withdrawn.

The invention comprises the combination with a frictional drive between the reeling handles and the reel or spool, of means causing first the release of the frictional engagement when the spool tends to turn in a reverse direction under the pull of the line and then applying frictional means to resist further turning of the spool in said reverse direction, so that the handles do not revolve when the line is being withdrawn.

The invention further comprises the combination with a frictional drive between the reeling handles and the reel or spool, and of frictional means for resisting turning of the spool when the line is being withdrawn therefrom, of a free wheel device between said frictional means and spool so that the frictional means do not resist reeling in, and means for placing said frictional means instantly into and out of service.

The invention further comprises the arrangement wherein the frictional means to resist withdrawal of the line comprises brakes applied by a lever which is self locking in the braking position, with screw means for adjusting the degree of the brake pressure and an additional hand lever for increasing the brake pressure beyond the amount determined by the screw means.

The invention further comprises the arrangement wherein the free wheel device of the frictional means which resist withdrawal of the line is combined with a lost motion mechanism providing for a predetermined amount of angular movement of the spool before the frictional means resist its further rotation.

The invention further comprises the provision of means which during the interval before the frictional means resist unreeling by the withdrawal of the line, release the frictional drive to the spool by the reeling handles.

Referring to the accompanying explanatory drawings:—

Figure 1 is a sectional elevation through a fishing reel constructed in one convenient form in accordance with this invention.

Figure 2 is a sectional elevation on the line A—B of Figure 1.

Figure 3:
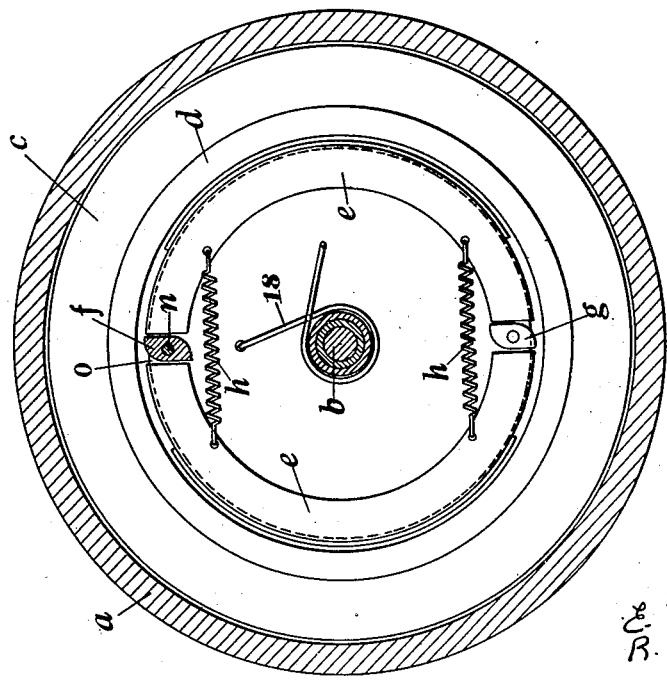
Figure 3 is a sectional elevation on the line C—D of Figure 1.

The complete reel comprises a barrel portion $a$ with a central spindle $b$ therein and integral therewith. The reel proper or spool $c$ rides freely upon the spindle $b$ and has at one side a projecting ring or collar $d$, with which can engage brake shoes $e$ expanded by the double cam $f$. A further double cam $g$ serves for the adjustment of the initial position of the brake shoes in the known manner. Springs $h$ hold the brake shoes normally in the brake off position and usual means are provided to prevent the cam $f$ being turned in the wrong direction to apply the brakes, that is in a clockwise direction in Figure 3 as the brakes are to be applied only by an anti-clockwise movement of the cam $f$. The latter is secured upon or formed integral with a fitting comprising a toothed quadrant $i$ and an arm $j$ which in certain circumstances, as hereinafter described, serves for turning the toothed quadrant. The latter gears with a toothed surface $k$ upon the disc $l$ which is free upon the spindle $b$ and is adapted to be turned by the handles $m$.

The cam $f$ and toothed quadrant $i$ are carried upon a pin $n$ projecting from a disc $o$ free upon the spindle $b$. A wheel $p$ mounted freely upon the boss of the disc $o$ has ratchet teeth $q$ at its periphery engaged by a pawl $r$ mounted in the casing $a$ and pressed by a spring $s$ into firm engagement with the teeth so as to act as a frictional resistance to movement of the wheel $p$ in the direction permitted by the pawl $r$. The wheel $p$ has a slot $t$ therein to accommodate the cam $f$ and the part of the quadrant boss around the pin $n$. A similar slot $u$ serves for balance purposes. There is a cam surface $p^1$ upon the inner face of the wheel $p$ within the ratchet teeth $q$.

The boss $v$ of the spool $c$ has ratchet teeth thereon engaged by pawls $w$ upon a ring $x$ having two projecting lugs $y$ thereon. The latter can engage projecting parts $z$ upon a brake drum 2 around which is a brake band 3, one end of which is connected to a link 4 adapted to be moved by a hand lever 5 pivoted at 6, the point of connection 7 of the link 4 and lever 5 being such that when the brake band is applied by the hand lever 5, the point 7 is lowered till the handle is self braking as will be readily understood from the drawings. The other end of the brake band is connected to a nut 8 through which threads a screw 9, one end of which has a knurled head 10 secured thereon whilst the other end has a spring loaded collar 11 thereon, the spring 12 bearing upon a part 13 fixed to the casing $a$. By screwing the head 10, any desired degree of brake pressure can be applied to the brake drum 2 when the hand lever 5 is turned to the full line position shown in Figure 3. If it is desired to apply momentarily an excess brake pressure, the handle 14 pivoted at 15 in the casing $a$ can be raised to cause it to engage the inner end of the knurled head fitting 10. This will press the nut 8 more firmly towards the link 4 at the other end of the brake band. The brake drum 2 has ratchet teeth 16 thereon with which engages a spring loaded pawl 17 with a view to providing a light check on the movement of the reel $c$ during unreeling under the pull of the fishing line when the brake 2 is released.

Figure 4:
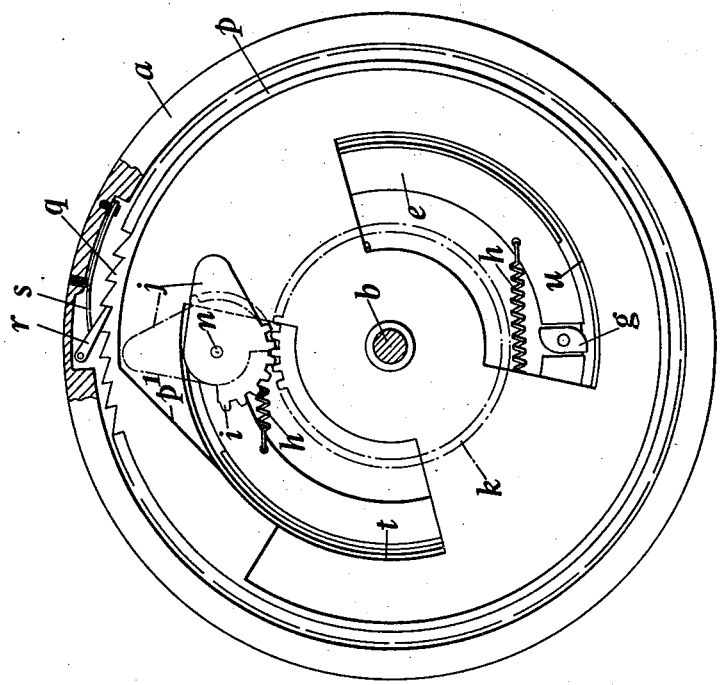
Figure 4 is a sectional elevation on the line E—F of Figure 1.

A torsion spring 18 connected at one end to the disc $o$ and at the other end to the wheel $p$ and coiled round the boss of $p$ tends to move the said disc into a position in which the quadrant $i$ is in the full line position shown in Figure 4.

The springs 19 tend to draw the brake band 3 clear of the brake drum 2 against the stops 20.

The action of the parts is as follows:—

When the handles $m$ are turned in a clockwise direction when looking from right to left of Figure 1, to wind in the line upon the spool $c$, they turn the disc $l$ upon the spindle $b$ and by means of the teeth $k$ turn the quadrant $i$ and so the cam $f$ which expands the brake shoes $e$ into frictional engagement with the collar or ring $d$ upon the spool $c$ so that the latter is rotated by the handles $m$. The ends of the torsion spring 18 are moved apart and the wheel $p$ is turned, the spring $s$ upon the pawl $r$ setting up a degree of resistance to such rotation. The arm $j$ is moved to the dotted line position against the surface $p^1$ of wheel $p$. If now a heavy pull be exerted through the line upon the spool $c$ to rotate the latter in an anti-clockwise direction, the toothed boss $v$ through the pawls $w$ turns the ring $x$ until the lugs $y$ engage the projection $z$ when the brake band 3 on the brake drum 2 resists further rotation to the extent desired and as determined by the handle 14 and by the milled head 10 upon the screw 9 passing through the nut 8. In the interval of lost motion, that is, before the lugs $y$ engage the projections $z$, the spool collar $d$ will tend to carry the brake shoes $e$ and the cam $f$ with quadrant $i$ with it, but the arm $j$ engages the cam surface $p^1$ which therefore turns the quadrant in a clockwise direction in Figure 4 and so turns the cam $f$ to release the brakes $e$. The wheel $p$ is prevented by its pawl $r$ from rotating under the pressure of the arm $j$ upon the quadrant. It follows therefore that the further turning of the spool $c$ by the pull upon the line is not transmitted to the wheel $l$ and handles $m$.

By raising the handle 5 to the dotted line position, the spool can be freed instantly for letting out bait and the brake can be instantly reapplied at the previously adjusted strength.

It will be seen that whilst the reeling handles $m$ are connected to the spool $c$ when reeling, they do not revolve with the spool when the line is being withdrawn. It will further be noted that whilst the brake 3 when applied resists the withdrawal of the line at all times, it does not resist reeling in, due to the action of the pawls $w$.

The springs 18 ensures that the disc $o$ is returned to its initial position relative to the wheel $p$ so that the parts are in correct position for re-engagment of the brake shoes $e$ when the handles $m$ are again turned.

We may vary the details of our improved game-fish reel to suit any particular requirements.

What we claim is:—

1. A fishing reel comprising in combination a spool for the fish line, a handle for turning said spool, a frictional drive interposed between said handle and said spool, automatic means operable by rotation of the said spool by withdrawal of line therefrom to disengage said frictional drive, frictional means to resist said rotation of said spool by said withdrawal comprising brakes and a manually movable lever to apply said brakes which is self-locking in the braking position and has screw means to adjust the braking pressure, together with means to prevent said brakes from resisting rotation of said spool during reeling-in of said line.

2. A fishing reel as claimed in claim 1 having also an additional manually movable lever for increasing the braking pressure beyond the amount determined by the screw means.

3. In a fishing reel as claimed in claim 1, the arrangement wherein the means specified which prevent the brakes from resisting rotation of the spool during reeling of the line are combined with a lost motion mechanism providing for a limited amount of angular movement of the spool before the said brakes resist its further rotation.

4. In a fishing reel as claimed in claim 1, the provision of lugs on a part associated with the spool adapted to engage projections on a brake drum associated with the brakes specified after the spool has been turned a limited angular distance by the withdrawal of the line therefrom.

5. In a fishing reel as claimed in claim 1, the arrangement wherein the means specified which prevent the brakes from resisting rotation of the spool during reeling of the line are combined with a lost motion mechanism providing for a limited amount of angular movement of the spool before the said brakes resist its further rotation, and in which means are provided which during the limited angular movement specified release the frictional drive to the spool by the reeling handles.

6. In a fishing reel as claimed in claim 1, the arrangement wherein the means specified which prevent the brakes from resisting rotation of the spool during reeling of the line are combined with a lost motion mechanism providing for a limited amount of angular movement of the spool before the said brakes resist its further rotation, together with the provision of a cam surface to turn an arm, a quadrant and a brake operating cam to release the brake drive from the reeling handles to the spool during the limited angular movement specified.

EDWARD TOWNLEY PEEL.
RICHARD FRAMPTON KINDERSLEY.